United States Patent [19]
Maki

[11] Patent Number: 6,106,039
[45] Date of Patent: Aug. 22, 2000

[54] BUMPER STRUCTURE FOR A VEHICLE

[75] Inventor: Tetsuo Maki, Kanagawa-ken, Japan

[73] Assignee: Nissan Motor Co., Ltd., Kanagawa-Ken, Japan

[21] Appl. No.: 09/144,089

[22] Filed: Aug. 31, 1998

[30]   Foreign Application Priority Data

Sep. 1, 1997   [JP]   Japan ..................................... 9-236269

[51] Int. Cl.⁷ ................................................. B60R 19/26
[52] U.S. Cl. .......................... 293/132; 293/133; 293/135; 293/137
[58] Field of Search .................................. 293/133, 134, 293/135, 137, 132

[56]   References Cited

U.S. PATENT DOCUMENTS

| | | | |
|---|---|---|---|
| 3,506,295 | 4/1970 | Yancey | 293/135 |
| 4,190,276 | 2/1980 | Hirano et al. | 293/133 |
| 4,272,114 | 6/1981 | Hirano et al. | 293/133 |
| 4,411,462 | 10/1983 | Buehrig et al. | 293/134 |
| 4,413,856 | 11/1983 | McMahan et al. | 293/132 |
| 4,457,547 | 7/1984 | Sekiyama et al. | 293/132 |
| 4,465,312 | 8/1984 | Werner | 293/132 |
| 4,778,208 | 10/1988 | Lehr et al. | 293/133 |
| 4,940,270 | 7/1990 | Yamazaki et al. | 293/132 |
| 5,201,912 | 4/1993 | Terada et al. | 293/133 |
| 5,441,319 | 8/1995 | Oyama et al. | |
| 5,772,267 | 6/1998 | Heim et al. | 293/133 |
| 5,803,514 | 9/1998 | Shibuya et al. | 293/132 |
| 5,876,077 | 3/1999 | Miskech et al. | 293/132 |
| 5,876,078 | 3/1999 | Miskech et al. | 293/132 |

FOREIGN PATENT DOCUMENTS

| | | |
|---|---|---|
| 0 546 352 A1 | 6/1993 | European Pat. Off. . |
| 2-60054 | 5/1990 | Japan . |
| 1 121 332 | 7/1968 | United Kingdom . |
| 1 320 808 | 6/1973 | United Kingdom . |
| 2 186 240 | 8/1987 | United Kingdom . |
| 2 308 100 | 6/1997 | United Kingdom . |

*Primary Examiner*—Joseph D. Pape
*Assistant Examiner*—Kiran Patel
*Attorney, Agent, or Firm*—McDermott, Will & Emery

[57]   ABSTRACT

A bumper structure for a vehicle comprises a first cross member, a bumper stay, a reinforcement, and a front bumper facsia. The bumper stay is connected with the first cross member to extend forward. The reinforcement is arranged in front of the bumper stay to be connected with the bumper stay. The bumper facsia is arranged in front of the reinforcement. The bumper stay includes a first portion being dispose on its front side and a second portion, which is different in strength from the first portion, being disposed on its rear side. The bumper facsia pushes backward the reinforcement with a front portion of the vehicle colliding with an obstacle. At that time, the reinforcement functions as a mass while one of the first portion and the second portion, which is low in strength, functions as a spring and is then crushed. Hence, a deceleration rises sharply relative to a moving stroke of the bumper facsia. Then, a remaining of the first portion and the second portion, which is high in strength, is crushed so that the deceleration relative to the moving stroke of the bumper facsia is maintained. Accordingly, the deceleration relative to the moving stroke has a substantially rectangular profile which rises sharply at a leading edge and does not have an excessive peak value, so that a collision energy is absorbed efficiently. As a result, a resistance performance of the body at the vehicle collision and a pedestrian effect performance are improved. In this manner, according to the above bumper structure, a resistance performance of the body at the vehicle collision and a pedestrian effect performance are improved. In addition, since the above performances are given even though the reinforcement is disposed in the close vicinity of the bumper facsia, a length of the bumper structure along the longitudinal direction of the body is shortened.

6 Claims, 13 Drawing Sheets

BUMPER STRUCTURE FOR A VEHICLE

The contents of Application No. TOKUGANHEI 9-236269 filed on Sep. 1, 1997 in Japan are hereby incorporated by reference.

BACKGROUND OF THE INVENTION

The present invention relates to a bumper structure for a vehicle in which only a bumper is crushed at a low-speed collision and which has an improved resistance performance of a body and a pedestrian effect performance together.

In a bumper structure for a vehicle in the related art, a reinforcement acting as a stiffening member is disposed on the back surface side of a bumper facsia as an exterior equipment member. The reinforcement is connected with a front portion of the body behind the reinforcement via a bumper stay disposed along the longitudinal direction of the body. An energy absorption member is disposed between the bumper facsia and the reinforcement so as to absorb an energy generated by the vehicle collision, etc. Accordingly, the load applied from the front side by the vehicle collision, etc. propagates through the bumper facsia, the energy absorption member, the reinforcement, and the front portion of the body in sequence (see Utility Model Application Publication (KOKAI) Hei 2-60054).

SUMMARY OF THE INVENTION

However, in such related art, in the event that the load applied by the vehicle collision, etc. propagates through the bumper facsia, the energy absorption member, the reinforcement, and the front portion of the body in sequence, the energy absorption member disposed in front of the reinforcement acts as a spring. Accordingly, an initial collision deceleration waveform is determined mainly depending upon a spring element (energy absorption member). For this reason, it is impossible to achieve a sharp rise characteristic of the deceleration waveform.

In contrast, according to the conventional bumper structure in which bumper constituent members are displaced along the longitudinal direction, a longitudinal length of the bumper structure must be increased inevitably in order to respond to both the external load applied from heavy obstacles such as the telegraph pole and the external load applied from rather light obstacles such as the pedestrian. Hence, there is a possibility that the above increase of the longitudinal length of the bumper structure has an effect on basic performances of the vehicle, e.g., a design property of the vehicle is spoiled, a minimum turning radius is increased, and so forth.

Therefore, it is an object of the present invention to provide a bumper structure for a vehicle which improves a resistance performance of the body at the vehicle collision and a pedestrian effect performance even though the longitudinal length of the bumper structure is shortened.

In order to achieve the above object, a bumper structure for a vehicle according to the present invention comprises a front member of a body, a bumper stay, a reinforcement, and a front bumper facsia. The bumper stay is connected with the front member to extend forward. The reinforcement is arranged in front of the bumper stay to be connected with the bumper stay. The bumper facsia is arranged in front of the reinforcement. The bumper stay includes a first portion being disposed on its front side and a second portion, which is different in strength from the first portion, being disposed on its rear side.

In other words, in the common related art, the spring element (the energy absorption member) is arranged more closely to the load input side than the reinforcement. On the contrary, in the present invention, the reinforcement is arranged more closely to the load input side than the spring element (the bumper stay) in contrast to the common related art.

DESCRIPTION OF THE PREFERRED EMBODIMENTS

Figure 1:
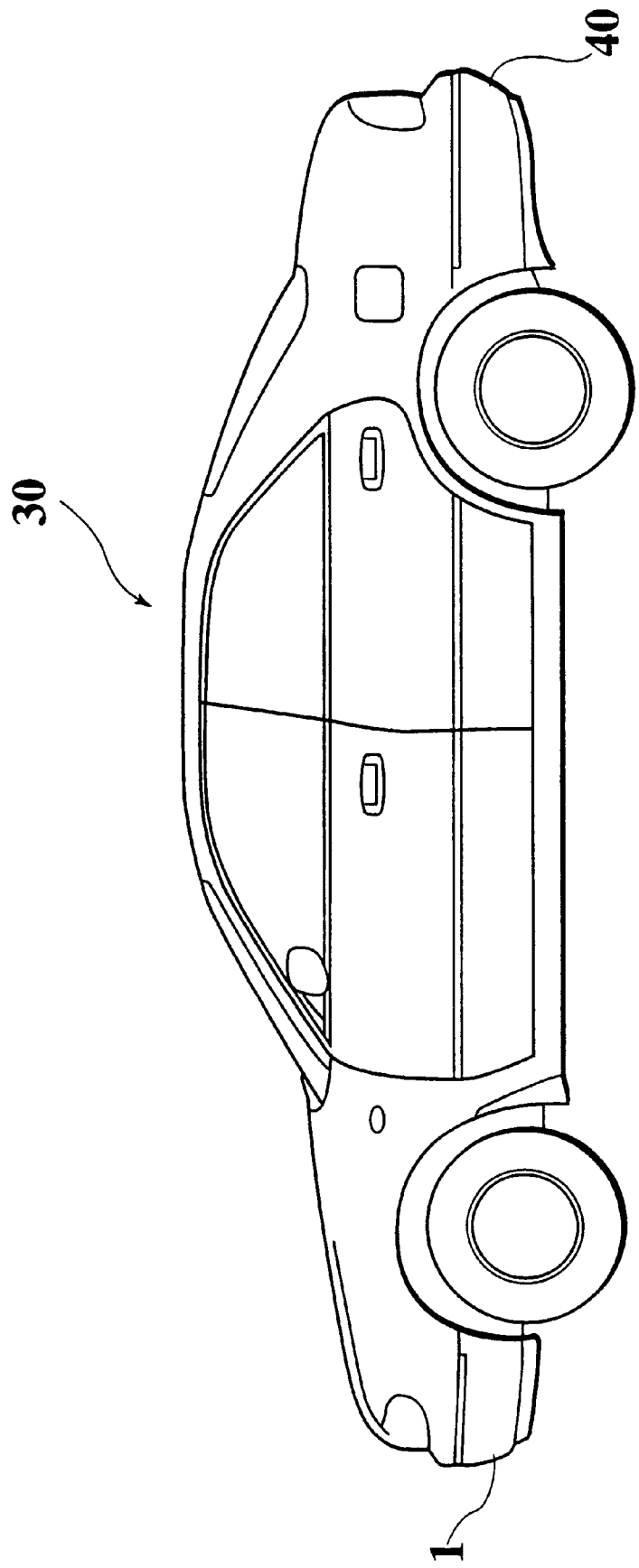
FIG. 1 is a side view of the present invention.
Figure 2:
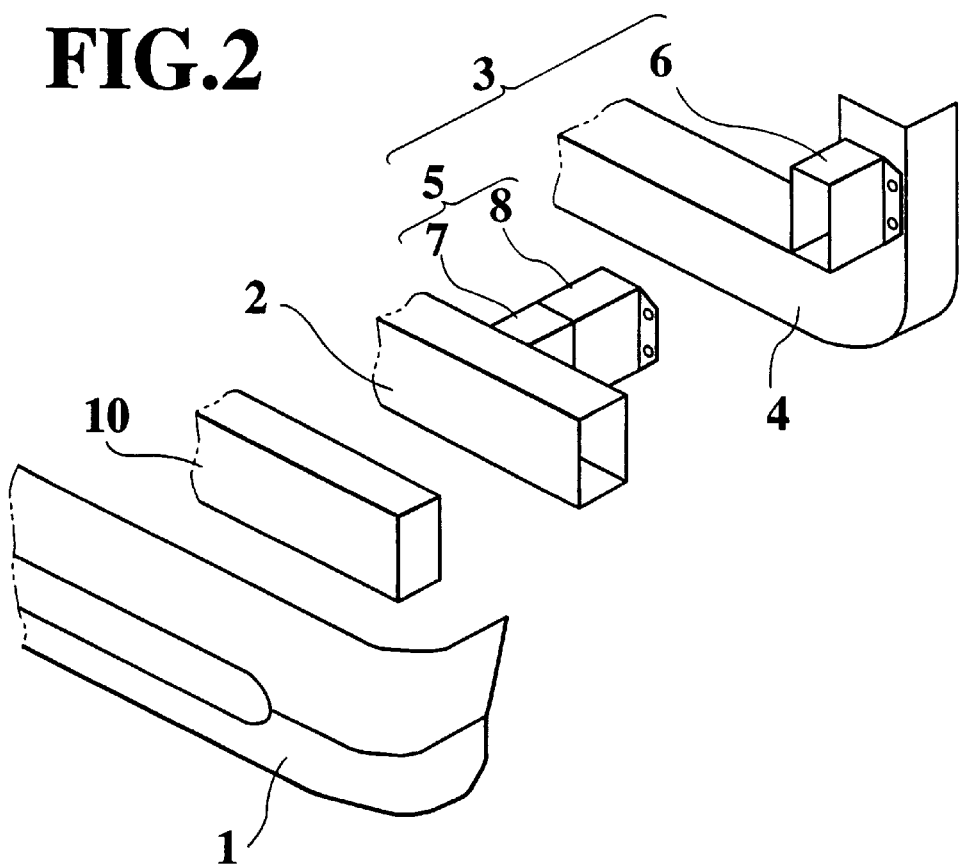
FIG. 2 is an exploded perspective view of a first embodiment.

FIGS. 1 to 7 are views of a first embodiment of the present invention. As shown in FIG. 1, a bumper facsia 1 as an exterior equipment member is disposed in a front end of a vehicle 30 along its lateral direction. This bumper facsia 1 is made of non-rigid resin and is easily deformed. As shown in FIG. 2, a reinforcement 2 which has a rectangular closed sectional shape structure is disposed on the back surface side of the bumper facsia 1 via an energy absorption member in the vicinity of the bumper facsia 1. This reinforcement 2 is a metal reinforcing member and bears up an overall strength of a front bumper.

Figure 3:
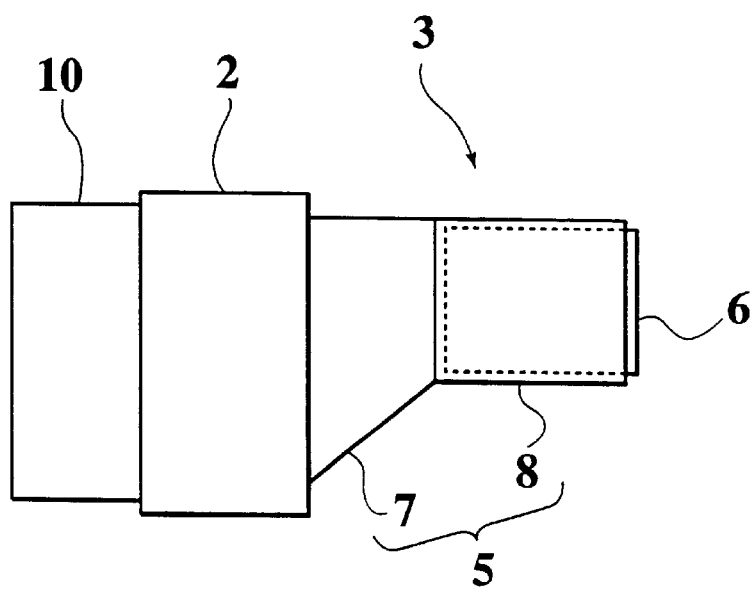
FIG. 3 is a side view of the first embodiment.

The reinforcement 2 is secured to a first cross member 4 acting as a "front member of a body" via a bumper stay 3 which extends along the lateral direction. As shown in FIG. 3, the bumper stay 3 has a double tubular structure consisting of a long outer tubular stay 5 and a short inner tubular stay 6. The outer tubular stay 5 is composed of a front stay (first portion) 7 and a rear stay (second portion) 8. The rear stay 8 is formed as a straight cylindrical shape, but the front stay 7 is formed as a tapered cylindrical shape.

Front and rear ends of the outer tubular stay 5 are connected with the reinforcement 2 and the first cross member 4 respectively. In the outer tubular stay 5, the rear stay 8 is set thinner in thickness than the front stay 7, so that a front side of the bumper stay 3 is set lower in strength than a rear side of the bumper stay 3. As a result, the bumper structure attains energy absorption to reduce the impact on the pedestrian at the collision.

Figure 4:
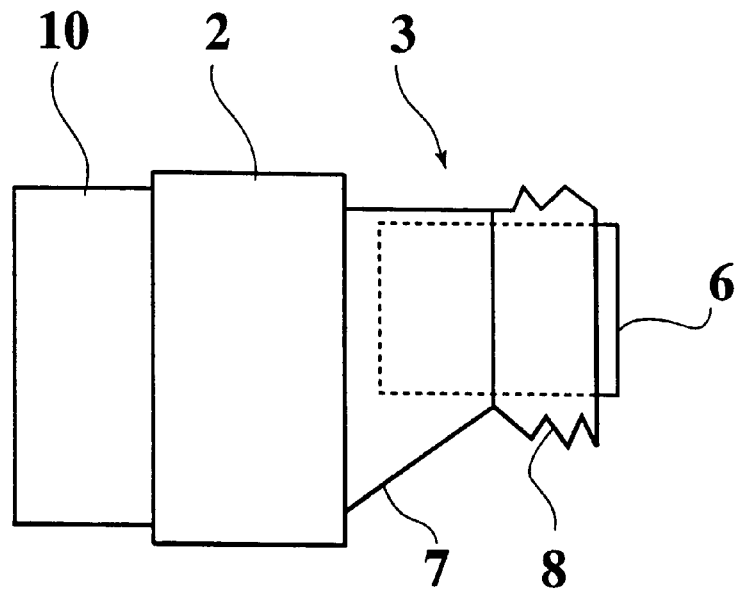
FIG. 4 is a side view showing a deformed state of the first embodiment.

In contrast, a rear end of the inner tubular stay 6 is merely connected with the first cross member 4, and a clearance is disposed between a front end of the inner tubular stay 6 and the reinforcement 2. Accordingly, as the applied load is small like the collision against the pedestrian, etc., the bumper structure takes such a deformation mode, as shown in FIG. 4, that only the rear stay 8 of the outer tubular stay 5, which has a small thickness, is crushed and deformed.

Figure 5:
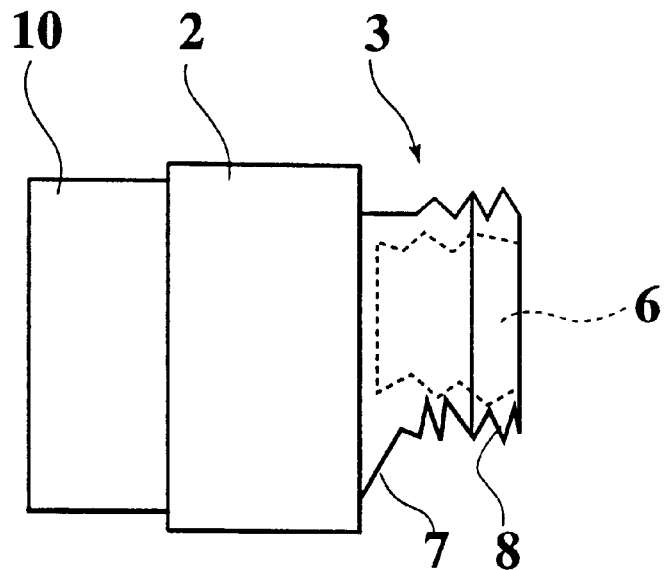
FIG. 5 is a side view showing another deformed state of the first embodiment.

As shown in FIG. 5, at the light collision or the heavy collision to generate the heavy load, first the thin rear stay 8 is crushed and deformed by a distanced equivalent to the above clearance, and then the thick front stay 7 and the inner tubular stay 6 are deformed simultaneously like bellows. As a result, an amount of collision energy absorption is increased.

Figure 6A:
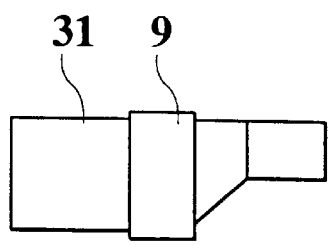
FIG. 6A is a side view of the related art.
Figure 6B:
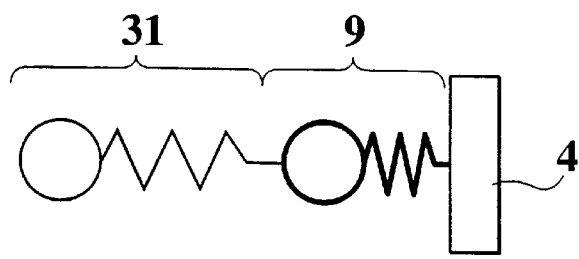
FIG. 6B is a schematic view showing a deformation mode of the related art.
Figure 6C:
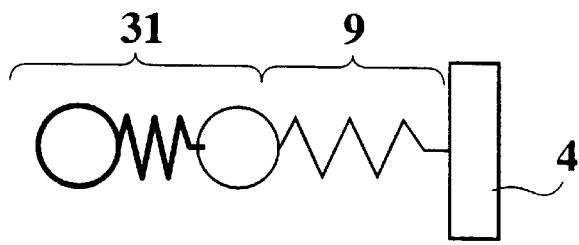
FIG. 6C is a schematic view showing a deformation mode of the first embodiment.
Figure 7:
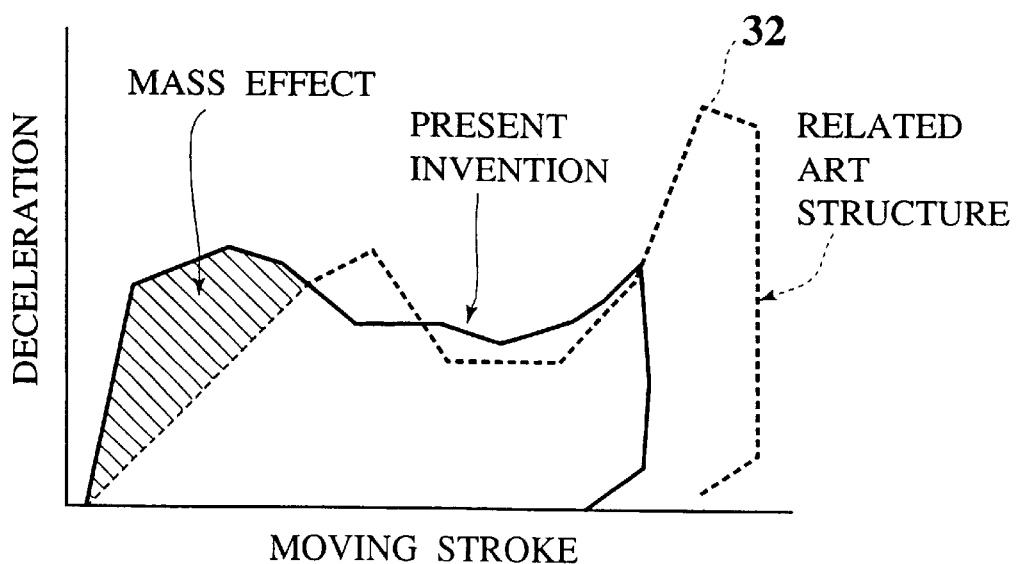
FIG. 7 is a graph showing a deceleration wavelength.
Figure 8:
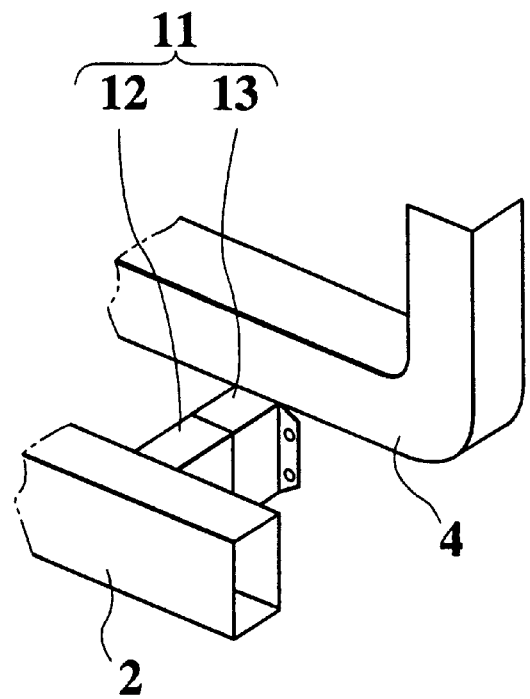
FIG. 8 is an exploded perspective view of a second embodiment.
Figure 9:
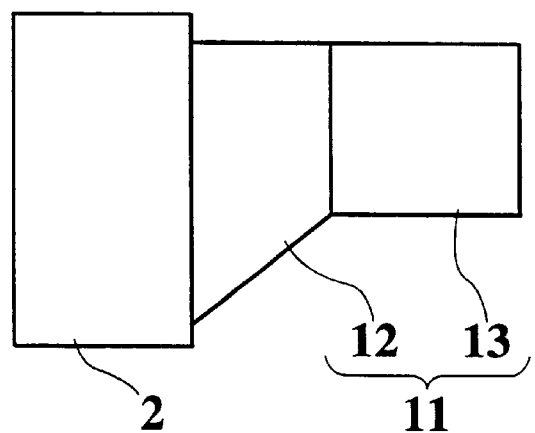
FIG. 9 is a side view of the second embodiment.
Figure 10A:
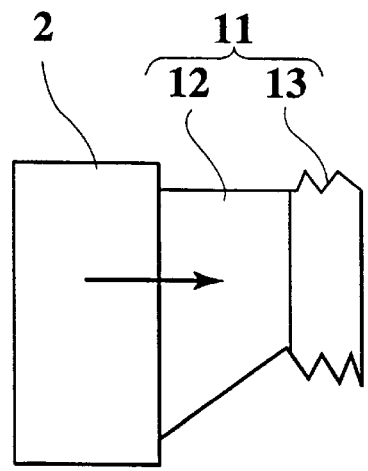
FIG. 10A is a side view showing a deformed state of the second embodiment.
Figure 10B:
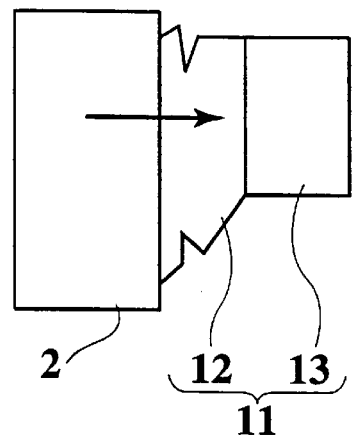
FIG. 10B is a side view showing another deformed state of the second embodiment.
Figure 11:
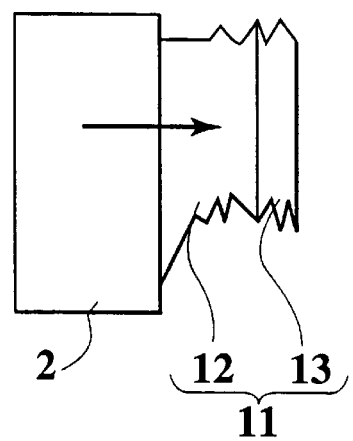
FIG. 11 is a side view showing still another deformed state of the second embodiment.
Figure 12:
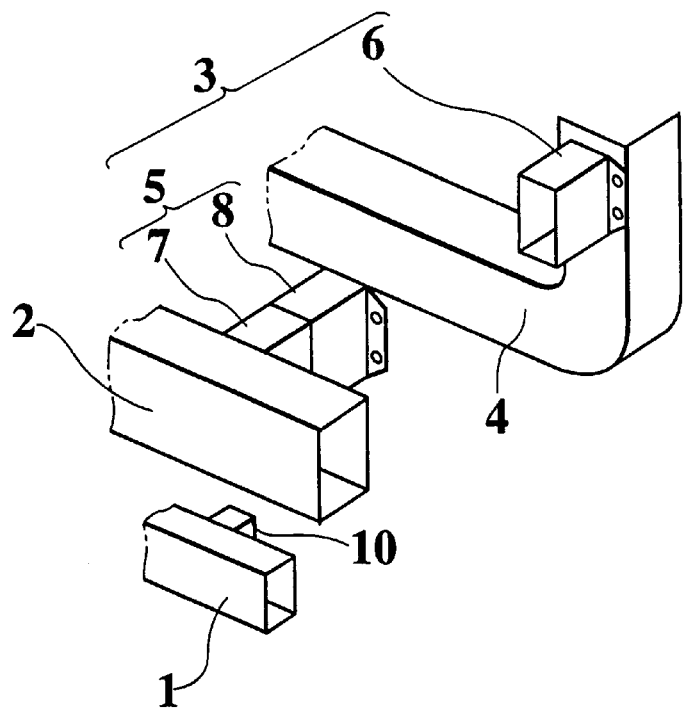
FIG. 12 is an exploded perspective view of a third embodiment.
Figure 13:
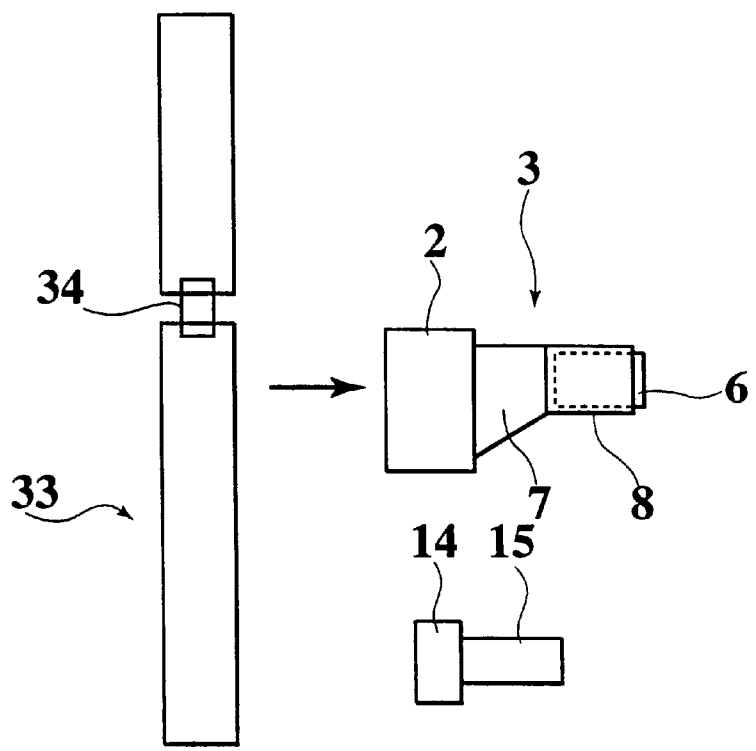
FIG. 13 is a side view of the third embodiment.
Figure 14:
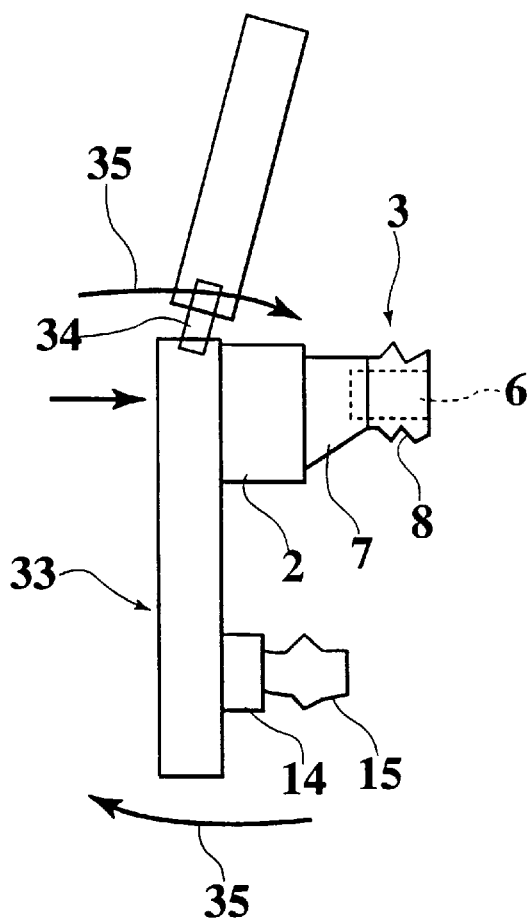
FIG. 14 is a side view showing a collision state of the third embodiment.

A difference between the deformation mode in the first embodiment and the deformation mode in the related art is explained with reference to FIGS. 6A to 6C and FIG. 7 hereinbelow. FIG. 6A shows a bumper structure in the related art, FIG. 6B shows a model of the bumper structure in FIG. 6A, and FIG. 6C shows a model of the bumper structure according to the first embodiment. In the bumper structure in the related art, an energy absorption member 31 for reducing the impact on the pedestrian is merely arranged serially in front of a reinforcement 9 for enhancing the resistance performance of the body. Hence, in the bumper structure in the related art, a deceleration waveform obtained at the vehicle collision has a gentle rise edge and comes to its peak 32 with the reinforcement 9 for the resistance performance reaching its bottom (see FIG. 7).

On the contrary, in the first embodiment, as described above, the bumper stay 3 whose strength is set differently along the longitudinal direction is employed. Therefore, the reinforcement 2 for the resistance performance is positioned in the vicinity of the bumper facsia 1 via the energy absorption member 10, which yields a reduction in size of the bumper structure. Since the reinforcement 2 is disposed in the vicinity of the bumper facsia 1, an initial rise of the deceleration becomes sharp due to a mass effect of the reinforcement 2. Accordingly, the bumper structure has the merits such that the deceleration waveform takes a substantially rectangular profile with a good energy efficiency and a moving stroke of the bumper facsia 1 is shortened (see FIG. 7). Because the front stay 7 moves backward simultaneously with the reinforcement 2, such front stay 7 functions as an auxiliary mass which contributes an increase of mass of the reinforcement 2. An abscissa of FIG. 7 denotes a moving stroke of the bumper facsia 1.

In this manner, even though the bumper structure is reduced in size by positioning the reinforcement 2 very close to the bumper facsia 1 to thus reduce the longitudinal length of the bumper structure, the resistance performance of the body at the vehicle collision and the pedestrian effect performance of the bumper structure are improved. In addition, in the first embodiment, because the strength of the rear stay 8 is lowered owing to reduction in the thickness, the strength of the bumper structure is controlled easily.

FIGS. 8 to 11 are views of a second embodiment. In this embodiment, a bumper stay 11 has a single tubular structure which consists of only a front stay (first portion) 12 and a rear stay (second portion) 13. The front stay 12 and the rear stay 13 are made different in strength respectively by setting their thickness and sectional area differently.

As the load is small, the front stay 12 or the rear stay 13 having smaller strength is crushed and deformed (see FIG. 10A or FIG. 10B), whereby a mass effect of the reinforcement 2 is achieved. As the load is heavy, both the front stay 12 and the rear stay 13 are crushed and deformed (see FIG. 11), whereby an amount of collision energy absorption is enhanced.

FIGS. 12 to 16 are views of a third embodiment. In this embodiment, in addition to the reinforcement 2 and the bumper stay 3 employed in the first embodiment, an auxiliary reinforcement 14 and an auxiliary bumper stay 15, both having a small sectional area respectively, are disposed below the reinforcement 2. The auxiliary bumper stay 15 is formed like a straight tube. A rear end of the auxiliary bumper stay 15 is connected with the first cross member 4 (see FIG. 2) via a bracket (not shown). This auxiliary bumper stay 15 is formed to have a thickness which is thicker than the rear stay 8 but substantially equal to the front stay 7. That is, the auxiliary bumper stay 15 has lateral compressive strength higher than the bumper stay 3.

According to this embodiment, like the above first and second embodiments, the initial deceleration is increased rapidly because the upper bumper stay 3 is deformed at an initial stage of the collision. Furthermore, the lower auxiliary bumper stay 15 controls a motion of legs 33 of the pedestrian to rotate in the direction indicated by an arrow 35 in FIG. 14. At the time of light collision, the bumper stay 3 and the auxiliary bumper stay 15 are crushed and deformed simultaneously to thus absorb the heavy load.

Figure 15:
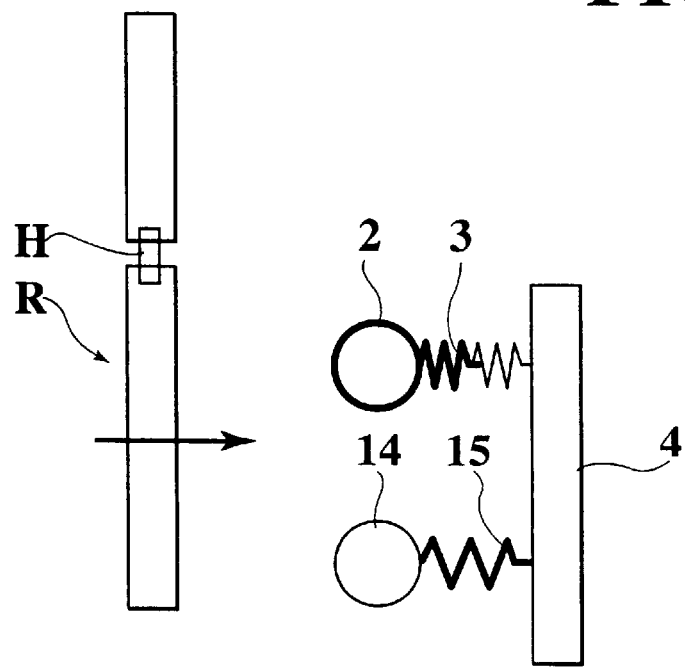
FIG. 15 is a view showing an operation mode of the third embodiment before deformation.
Figure 16:
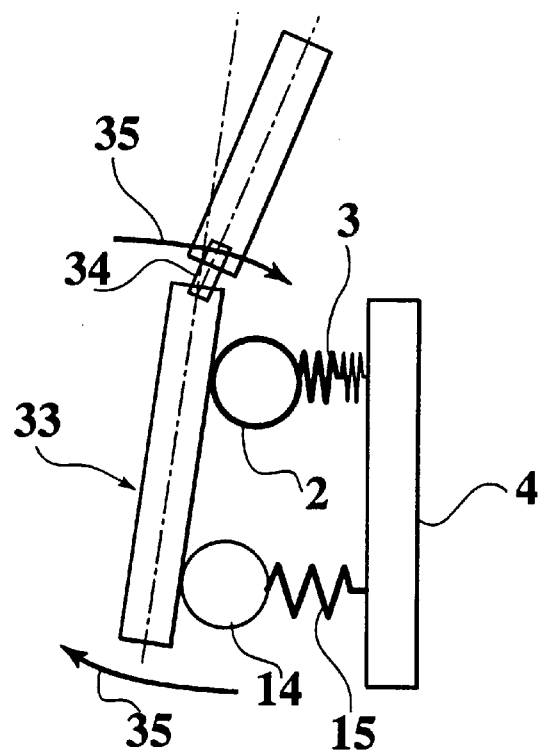
FIG. 16 is a view showing another operation mode of the third embodiment after deformation.

In other words, as shown in deformation modes in FIGS. 15 and 16, the bumper structure according to this embodiment has the merits such that it controls a bending motion of the legs 33 of the pedestrian in the rotation direction because the energy absorption structure is split into upper and lower bumper structures to optimize rigidity and mass, and thus the impact on the knees 34 of the pedestrian is suppressed to the lowest minimum.

Figure 17:
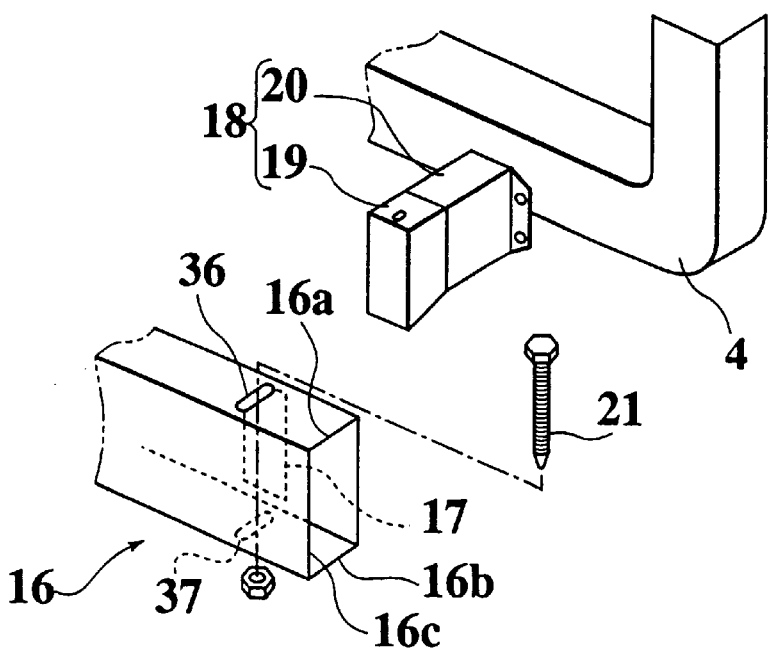
FIG. 17 is an exploded perspective view of a fourth embodiment.
Figure 18:
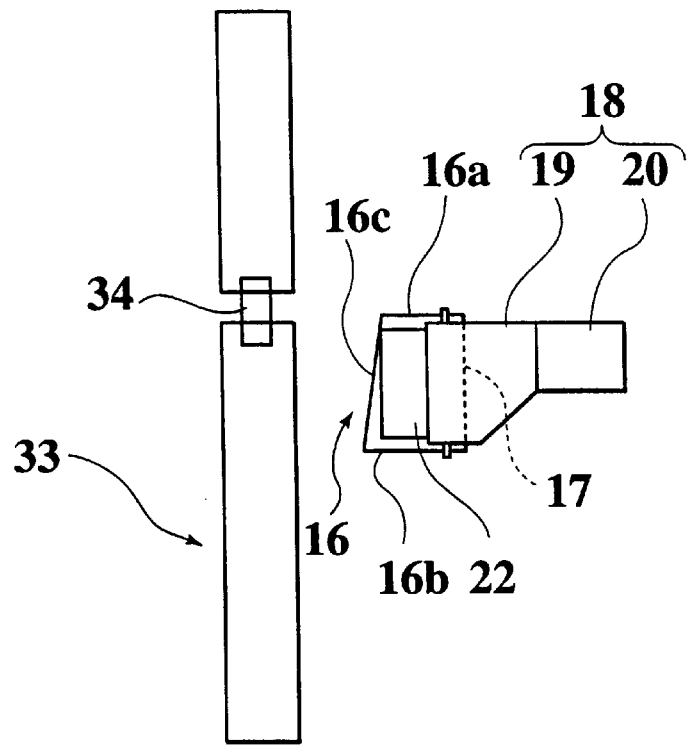
FIG. 18 is a side view of the fourth embodiment.
Figure 19:
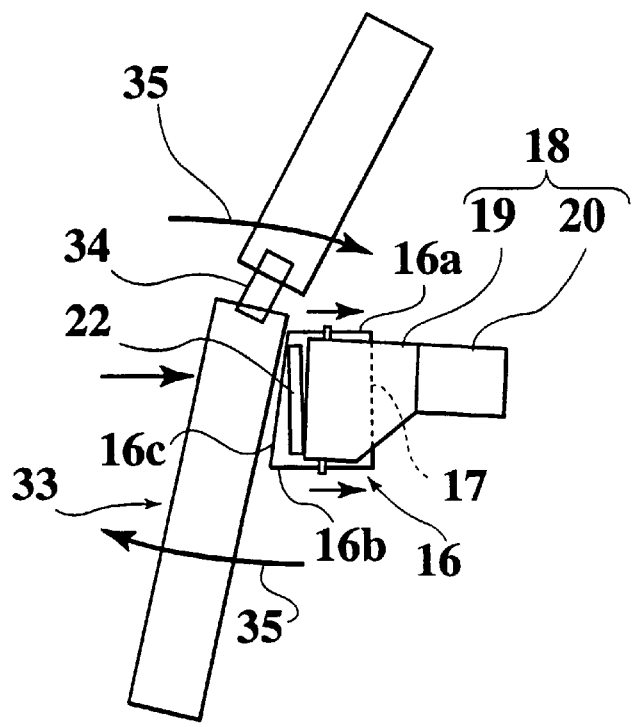
FIG. 19 is a side view showing a collision state of the fourth embodiment.

FIGS. 17 to 19 are views of a fourth embodiment. In this embodiment, a reinforcement 16 has a trapezoidal sectional shape. In other words, a lower surface portion 16b extends forward rather than an upper surface portion 16a and therefore a front surface portion 16c is formed obliquely. An opening 17 is formed on a rear surface of the reinforcement 16. A front stay 19 of a bumper stay 18 is inserted into an inside of the reinforcement 16 via the opening 17. The front stay (first portion) 19 of the bumper stay 18 is formed thick, but a rear stay (second portion) 20 of the bumper stay 18 is formed thin.

Slits 36, 37 are formed on the upper surface portion 16a and the lower surface portion 16b of the reinforcement 16 along the longitudinal direction respectively. A pin 21 is inserted into the slits 36, 37 to penetrate through the front stay 19 of the bumper stay 18. An energy absorption member 22 made of resin is disposed, between the front stay 19 and the front surface portion 16c of the reinforcement 16. Since the energy absorption member 22 is disposed in the inside of the reinforcement 16, the longitudinal length of the bumper structure is not increased.

As the reinforcement 16 is pushed backward by the load applied at the vehicle collision, such reinforcement 16 moves back while crushing the energy absorption member 22 by the slits 36, 37. Hence, energy is absorbed without fail. Because the reinforcement 16 is disposed in the neighborhood of the bumper facsia 1, the initial deceleration increases rapidly, like the above embodiments. In addition, because the front surface portion 16c of the reinforcement 16 is formed obliquely, the bumper structure according to the fourth embodiment controls the bending motion of the legs 33 of the pedestrian in the rotation direction and also reduces the impact on the knees 34 of the pedestrian.

Figure 20:
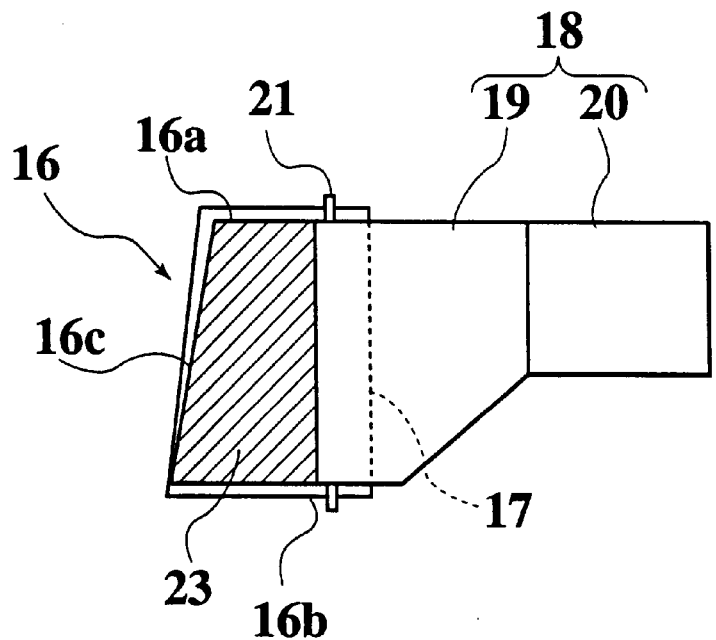
FIG. 20 is a side view of a fifth embodiment.
Figure 21:
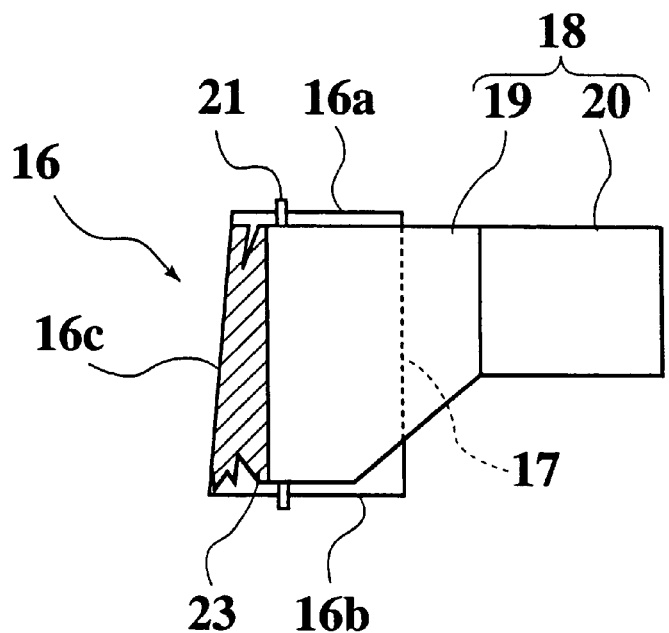
FIG. 21 is a side view showing a deformed state of the fifth embodiment.

FIGS. 20 and 21 are views of a fifth embodiment. In this embodiment, an energy absorption member 23 having a metal thin tubular shape is formed to extend forward from the front stay 19, and forms as the energy absorption member 22 made of resin in the fourth embodiment. A front end of the energy absorption member 23 is then connected to the front surface portion 16c of the reinforcement 16.

Figure 22:
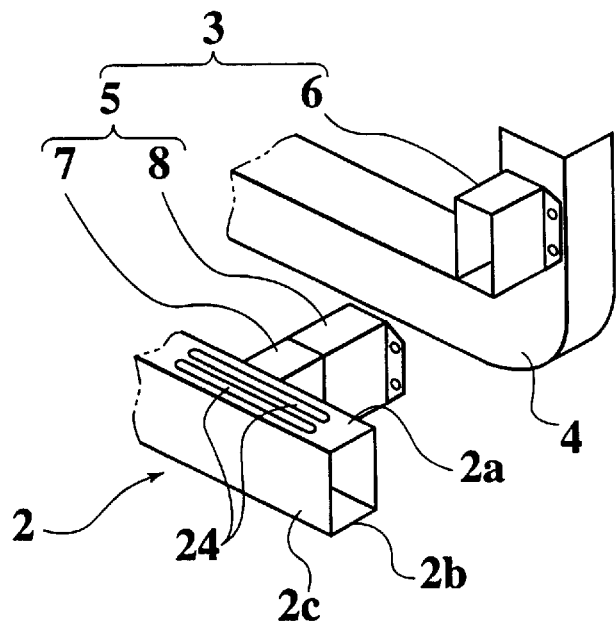
FIG. 22 is an exploded perspective view of a sixth embodiment.
Figure 23:
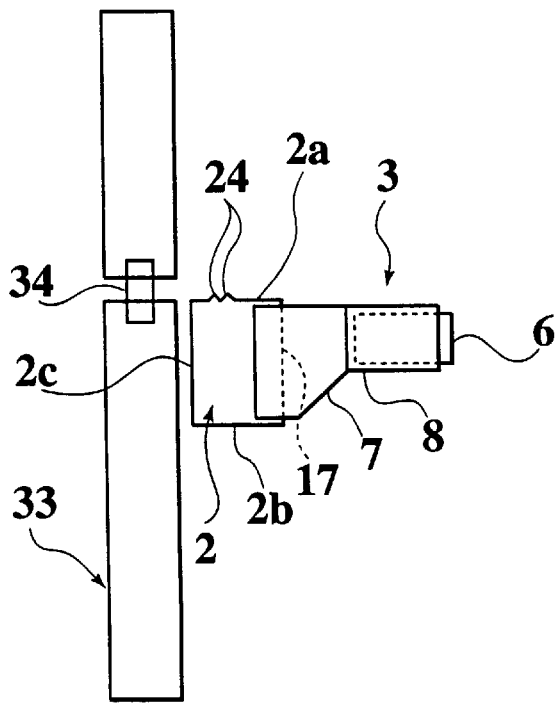
FIG. 23 is a side view of the sixth embodiment.
Figure 24:
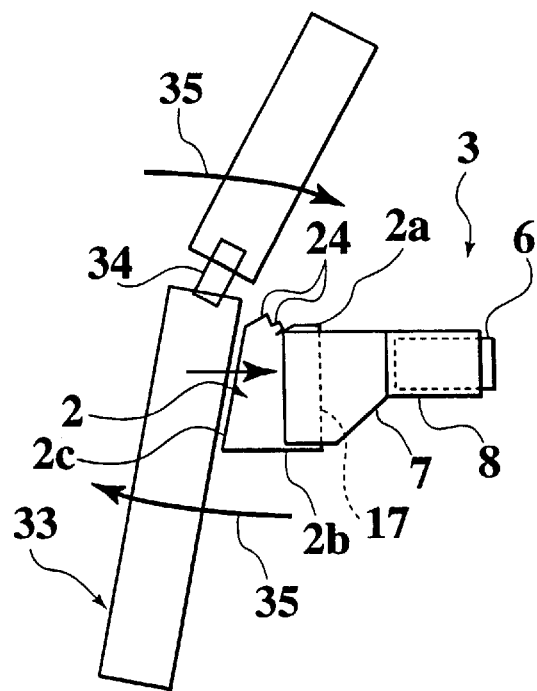
FIG. 24 is a side view showing a collision state of the sixth embodiment.

FIGS. 22 to 24 are views showing a bumper structure according to a sixth embodiment of the present invention. In this embodiment, the front stay 7 of the bumper stay 3 as in the first embodiment is connected with the reinforcement 2 under the situation that such front stay 7 is slightly inserted into the reinforcement 2 via an opening 17 formed on a rear surface of the reinforcement 2.

Two bead portions 24 are formed in the vehicle width direction on an upper surface portion 2a of the reinforcement 2, which is not overlapped with an inserted portion of the front stay 7. Accordingly, as the legs 33 of the pedestrian collide with the bumper structure, only the upper surface portion 2a is crushed and deformed to bring a front surface portion 2c into an oblique state. Therefore, the bumper structure according to the sixth embodiment controls the bending motion of the legs 33 of the pedestrian in the rotation direction and also reduces the impact on the knees 34 of the pedestrian. In this case, such bead portions 24 may also be formed on a lower surface portion 2b. But, in such case, the number of the bead portions 24 formed on the upper surface portion 2a must be increased larger than those formed on the lower surface portion 2b.

Figure 25:
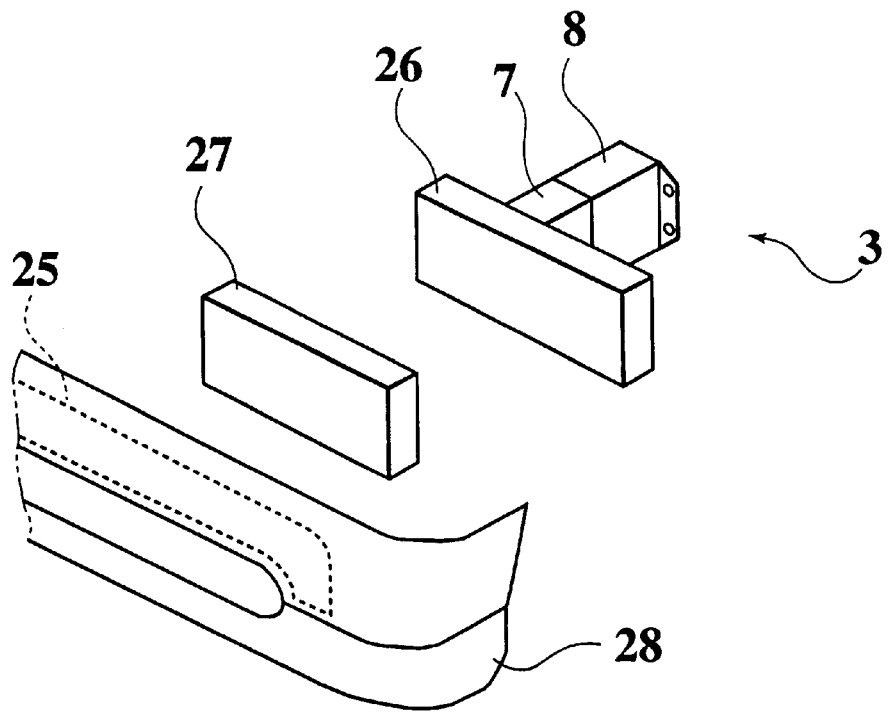
FIG. 25 is an exploded perspective view of a seventh embodiment.
Figure 26:
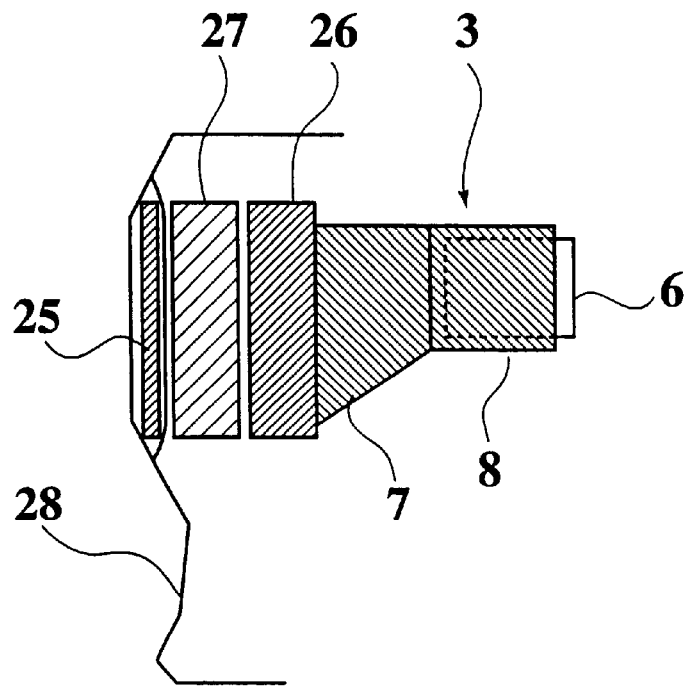
FIG. 26 is a side view of the seventh embodiment.

FIGS. 25 and 26 are views showing a bumper structure according to a seventh embodiment of the present invention. In this embodiment, an energy absorption member 27 is disposed between a front reinforcement 25 and a rear reinforcement 26, both being separated in the longitudinal direction. The front reinforcement 25 formed of a resin plate is disposed on a rear surface of a bumper facsia 28. The rear reinforcement 26 is made of metal having a closed sectional shape. A lateral length of the rear reinforcement 26 is formed smaller than the reinforcement 2 (see FIG. 2) being employed in the first embodiment. Because the front reinforcement 25 is disposed in the vicinity of a bumper facsia 28, the mass effect is enhanced as described in the above embodiments. In addition, since longitudinal lengths of the front reinforcement 25 and the rear reinforcement 26, which are separated in the longitudinal direction, are reduced short respectively, a longitudinal length of the overall bumper structure is not increased even though the energy absorption member 27 is put between the front reinforcement 25 and the rear reinforcement 26.

The bumper structures in the above first to seventh embodiments explained as the front portion of the vehicle can be applied to the rear portion of the vehicle which has a rear bumper facsia 40 (see FIG. 1).

What is claimed is:

1. A bumper structure for a vehicle front body, comprising:

a front member laterally disposed in the vehicle front body;

a bumper stay vertically fixed to and extending forward from the front member, the bumper stay having a first portion on its front side and a second portion weaker than the first portion on its rear side;

a reinforcement laterally disposed in front of the bumper stay and fixed the bumper stay; and a front bumper facsia arranged in front of the reinforcement and covering the reinforcement.

2. A bumper structure according to claim 1, wherein the second portion is formed thinner than the first portion.

3. A bumper structure according to claim 1, wherein the bumper stay has an outer tubular stay and an inner tubular stay within the outer tubular stay, the outer tubular stay and the inner tubular stay form a double tubular structure, the outer tubular stay is connected with the front member and the reinforcement, the outer tubular stay has the first portion and the second portion, the inner tubular stay is shorter than the outer tubular stay, and the inner tubular stay is connected with the front member and is arranged apart from the reinforcement.

4. A bumper structure according to claim 1, wherein the front member has a first cross member, and wherein the bumper facsia, the reinforcement, and the first cross member extend in a width direction of the vehicle.

5. A front bumper structure for a vehicle front body, comprising:

a front member laterally disposed in the vehicle front body;

a bumper stay vertically fixed to and extending forward from the front member, the bumper stay having a first portion on a front side of the bumper stay and a second portion weaker than the first portion on a rear side of the bumper stay, wherein, during a collision, the first portion acts as an auxiliary mass and the second portion acts as a spring to absorb energy from the collision;

a reinforcement laterally arranged in front of the bumper stay and connected to the bumper stay; and a front bumper facsia arranged in front of and covering the reinforcement.

6. An energy absorbing body structure for a motor vehicle, comprising:

a cross member laterally disposed in the motor vehicle;

a bumper stay fixed to a forward side of the cross member;

a reinforcement laterally disposed and fixed to the a forward side of the bumper stay;

an energy absorbing member laterally disposed and fixed to a forward side of the reinforcement;

a bumper facsia covering the energy absorbing member, wherein the bumper stay has a cross member side portion secured to the cross member and a reinforcement side portion secured to the reinforcement, and wherein the cross member side portion is less rigid than the reinforcement side portion.

* * * * *